(12) United States Patent
Carnevali

(10) Patent No.: US 8,505,861 B2
(45) Date of Patent: Aug. 13, 2013

(54) SUCTION CUP MOUNTING PLATFORM HAVING FLEXIBLE BASE

(76) Inventor: Jeffrey D. Carnevali, Seattle, WA (US)

( * ) Notice: Subject to any disclaimer, the term of this patent is extended or adjusted under 35 U.S.C. 154(b) by 683 days.

(21) Appl. No.: 12/006,386

(22) Filed: Jan. 2, 2008

(65) Prior Publication Data

US 2009/0166497 A1 Jul. 2, 2009

Related U.S. Application Data

(63) Continuation-in-part of application No. 11/977,812, filed on Oct. 26, 2007.

(51) Int. Cl.
*A47B 91/00* (2006.01)
*F16M 11/20* (2006.01)

(52) U.S. Cl.
USPC ..................... 248/188.7; 248/188.8

(58) Field of Classification Search
USPC .......... 248/205.5, 205.6, 205.7, 205.8, 205.9, 248/206.1, 206.2, 362, 363, 309.3, 683, 467, 248/537, 188.7, 205.3, 346.01, 309.1, 615, 248/163.1, 431, 188.8
See application file for complete search history.

(56) References Cited

U.S. PATENT DOCUMENTS

| | | | | |
|---|---|---|---|---|
| 816,588 A * | 4/1906 | Moore | ........................... | 248/467 |
| 1,466,961 A * | 9/1923 | Prim | ........................... | 248/205.7 |
| 2,308,771 A * | 1/1943 | Mooney | ........................ | 242/375 |
| 2,310,842 A * | 2/1943 | Davitt et al. | ..................... | 24/369 |
| 2,777,141 A * | 1/1957 | Nye | ................................. | 15/105 |
| 2,968,460 A * | 1/1961 | Van Dusen | ................. | 248/205.3 |
| 3,841,635 A * | 10/1974 | Wilson | ........................... | 473/572 |
| 4,101,104 A * | 7/1978 | Minard | ........................... | 248/95 |
| 4,309,011 A * | 1/1982 | Spector | ..................... | 248/205.3 |
| 4,398,643 A * | 8/1983 | Conlon | ......................... | 248/500 |
| 4,835,024 A * | 5/1989 | Hallay | ........................... | 428/24 |
| 4,842,912 A * | 6/1989 | Hutter, III | .................... | 428/66.6 |
| 5,176,346 A * | 1/1993 | Liu | .............................. | 248/206.1 |
| 5,483,916 A * | 1/1996 | Kolvites et al. | .............. | 116/173 |
| 5,511,752 A * | 4/1996 | Trethewey | ................. | 248/205.9 |
| 5,743,505 A * | 4/1998 | Sofy | ........................ | 248/346.01 |
| 5,762,305 A * | 6/1998 | Lee | ............................. | 248/205.8 |
| 5,845,885 A * | 12/1998 | Carnevali | .................. | 248/181.1 |
| 6,109,271 A * | 8/2000 | Webber et al. | ............. | 131/240.1 |
| 6,375,143 B1 * | 4/2002 | Burns | ........................... | 248/363 |
| 6,499,707 B2 * | 12/2002 | Hamerski et al. | .......... | 248/205.3 |
| 6,561,476 B2 | 5/2003 | Carnevali | | |
| 6,648,285 B1 * | 11/2003 | Woollen | ..................... | 248/205.8 |
| 6,666,420 B1 | 12/2003 | Carnevali | | |
| 6,840,487 B2 * | 1/2005 | Carnevali | ................. | 248/346.06 |
| 7,276,272 B2 * | 10/2007 | Mizuno et al. | ............... | 428/40.1 |
| 7,395,714 B2 * | 7/2008 | Georgeson et al. | ............ | 73/634 |
| 2003/0102419 A1 * | 6/2003 | Carnevali | ................... | 248/346.2 |
| 2004/0211867 A1 * | 10/2004 | Doyle | ........................ | 248/205.5 |

* cited by examiner

*Primary Examiner* — Nkeisha Smith
(74) *Attorney, Agent, or Firm* — Charles J. Rupnick Attorney at Law

(57) ABSTRACT

A monolithic suction cup mounting platform formed of a substantially rigid plate having first and second opposing faces; a suction cup mounting surface formed on the first face of the plate; at least one flexible leg coupled to the second face of the plate and having a bonding surface facing away from the plate; and a bonding agent adhered to the bonding surface of the flexible leg.

16 Claims, 12 Drawing Sheets

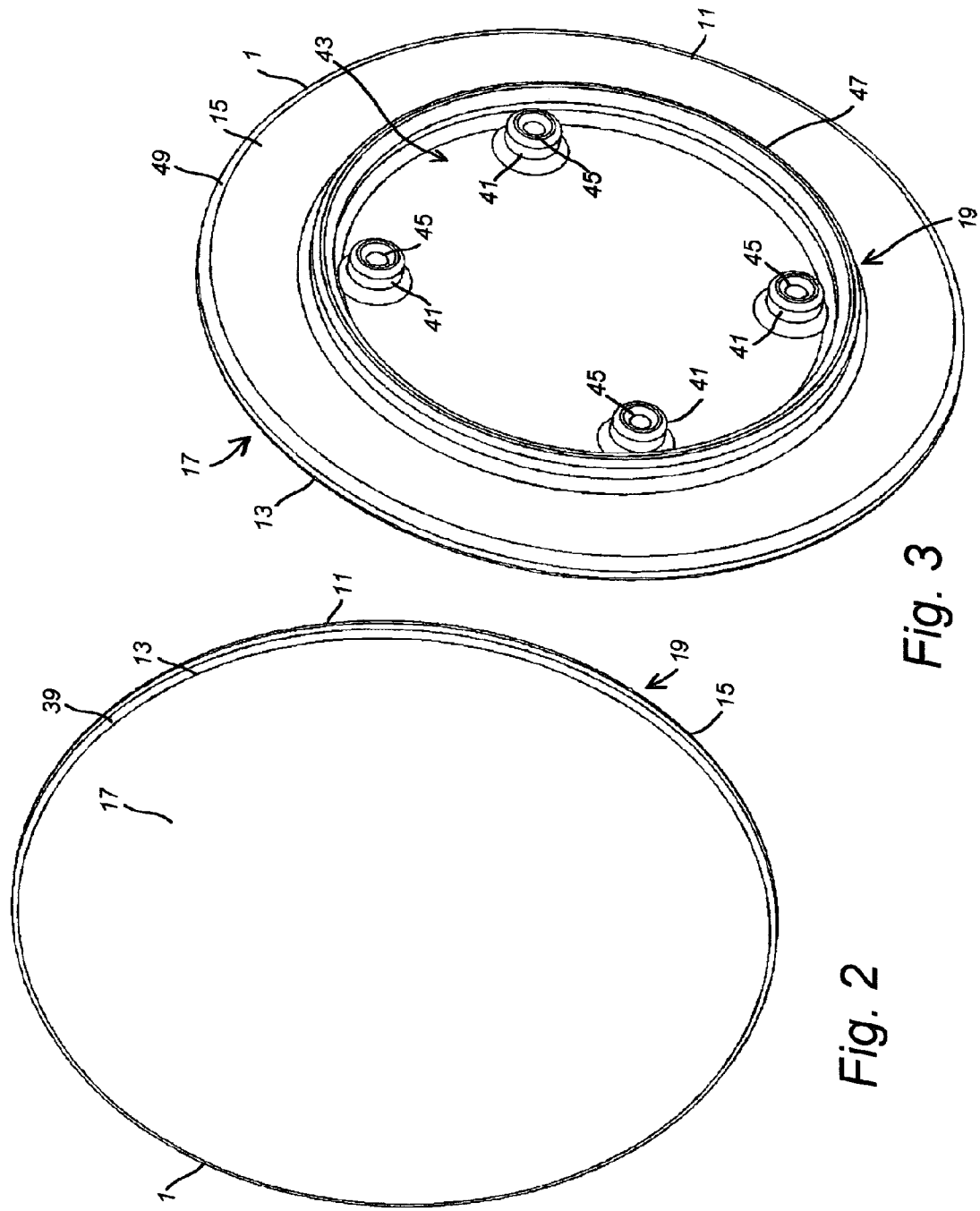

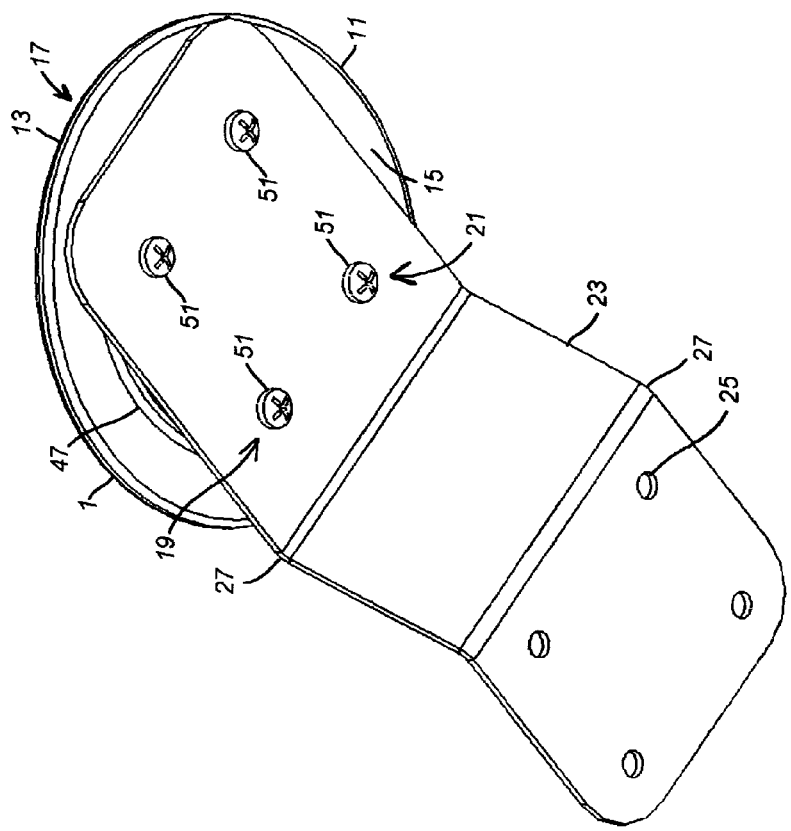
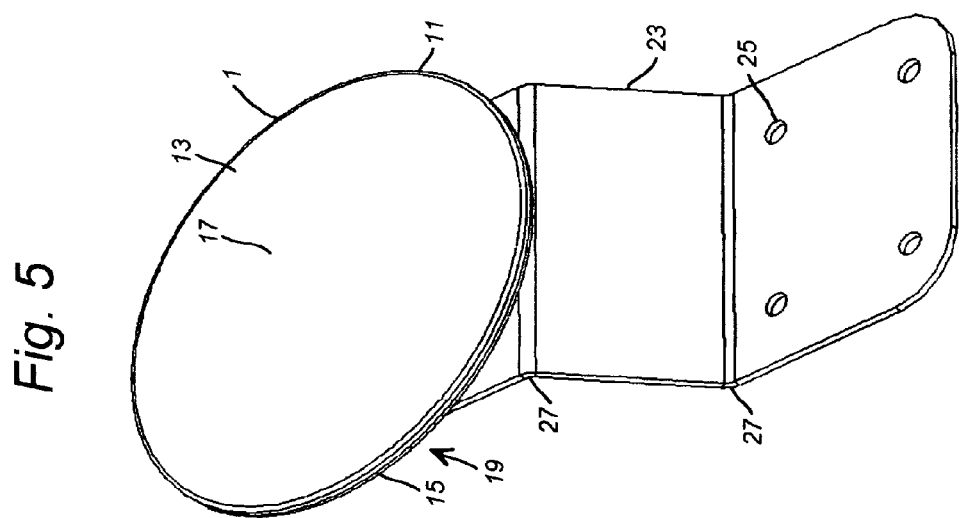

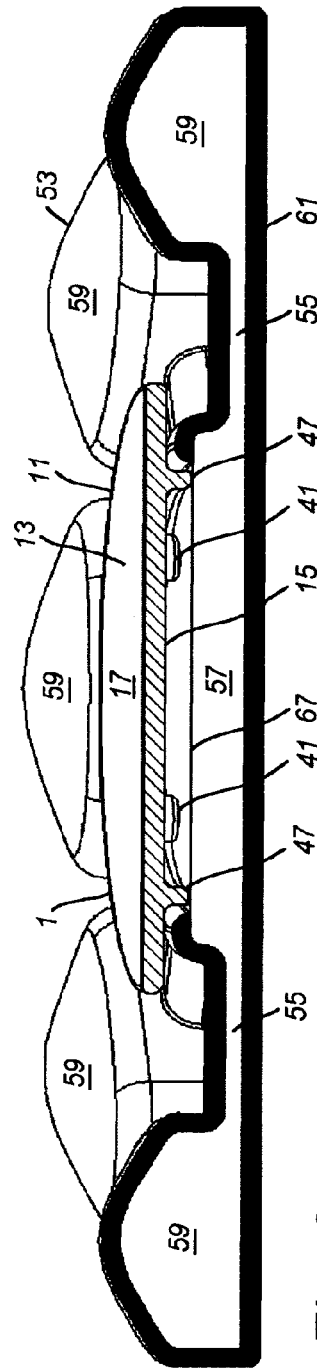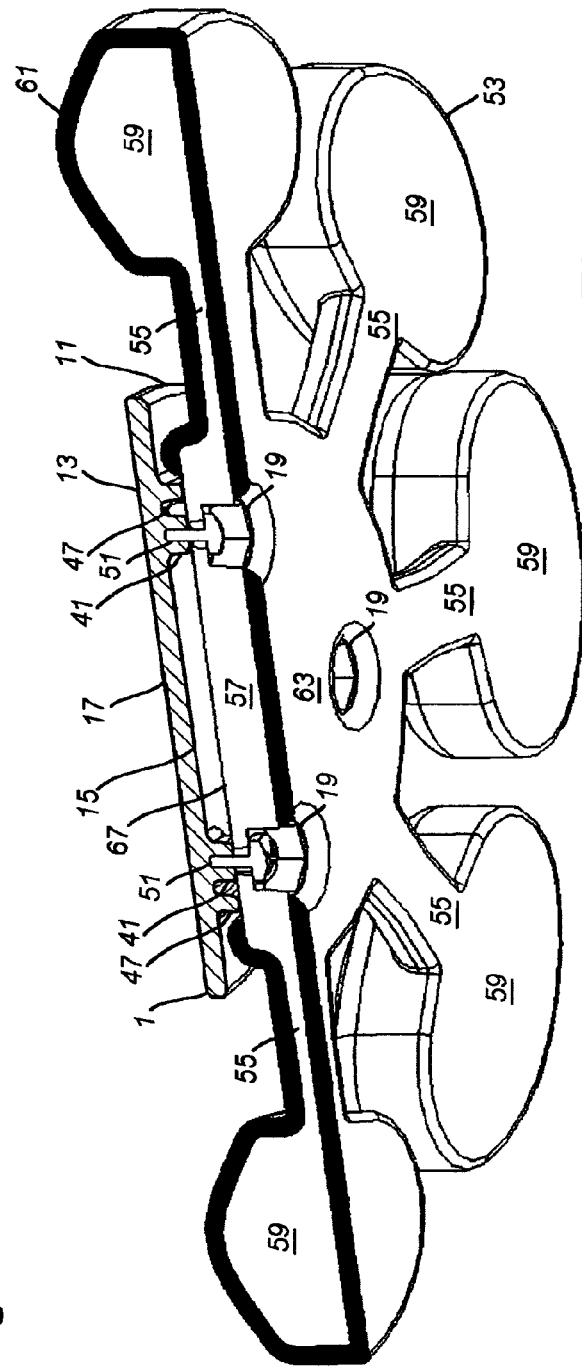

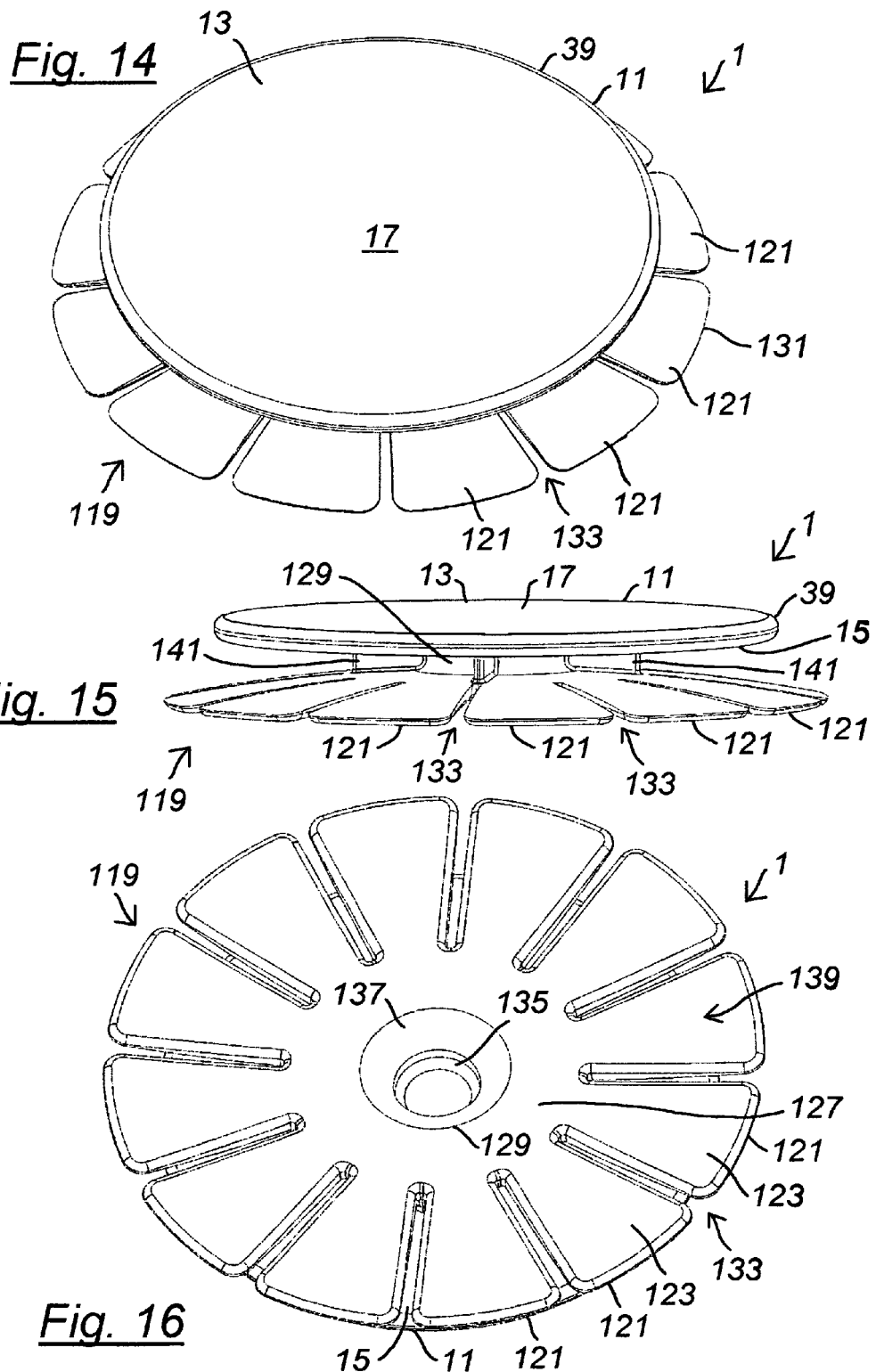

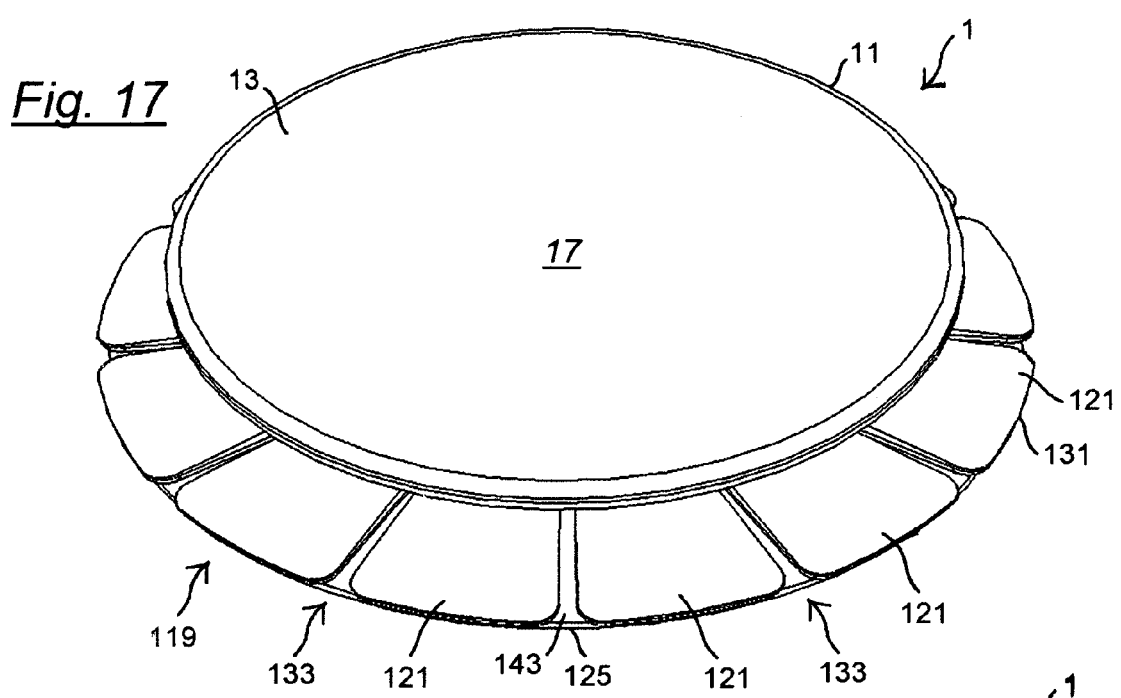
*Fig. 17*
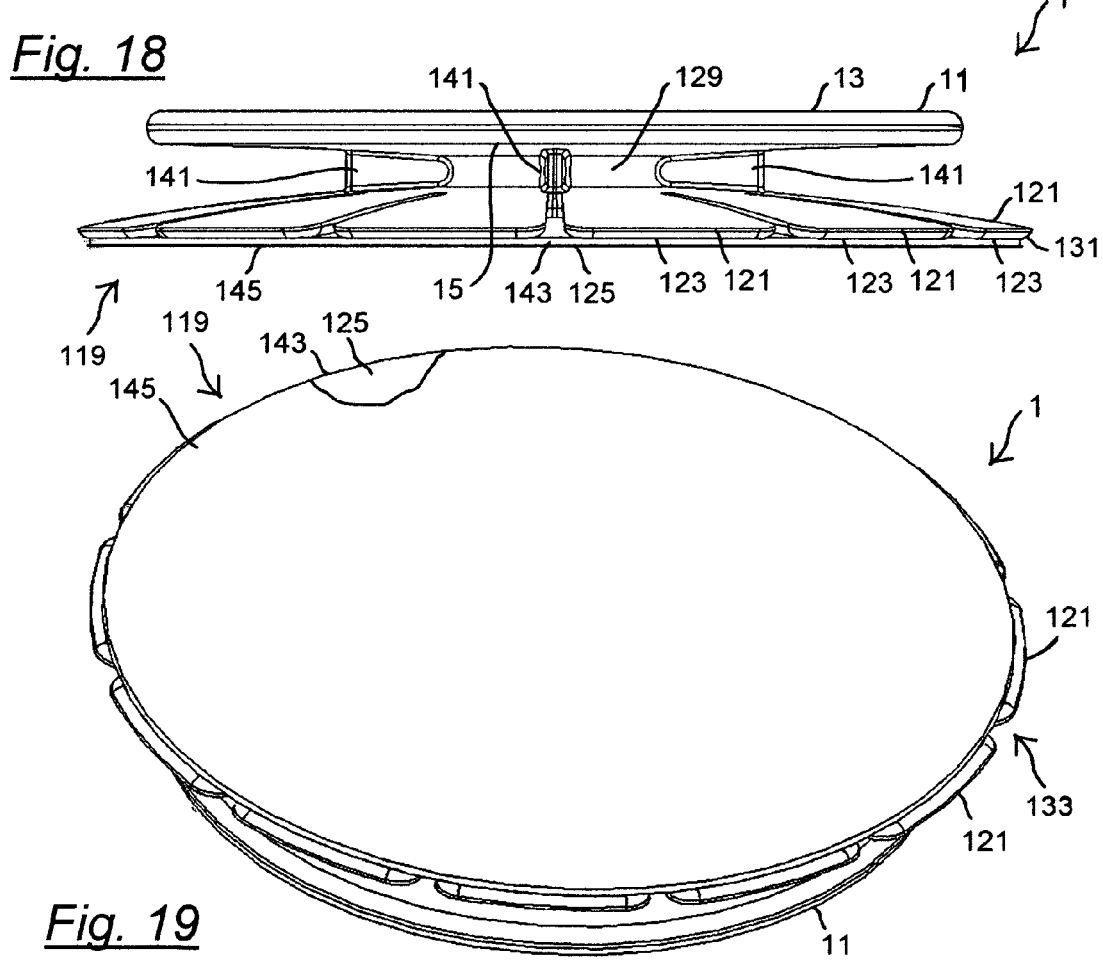
*Fig. 18*
*Fig. 19*

SUCTION CUP MOUNTING PLATFORM HAVING FLEXIBLE BASE

This application is a Continuation-in-part and claims priority benefit of copending parent U.S. patent application Ser. No. 11/977,812 filed in the name of Jeffrey D. Carnevali on Oct. 26, 2007, the complete disclosure of which is incorporated herein by reference.

FIELD OF THE INVENTION

The present invention relates generally to mounting platforms for attachment of suction cups, and in particular to suction cup attachment platforms having flexible attachment members for conforming to non-planar surfaces.

BACKGROUND OF THE INVENTION

Suction cup mounting devices are generally well-known for mounting various handheld electronic devices for hands-free operation, particularly in automobiles and other vehicles. However, the only smooth and flat surface available for mounting suction cups in many vehicles are the front or side windscreens. As a result, suction cup mounting devices are being replaced by custom vehicle specific mounts (VSM) for installing a wide range of handheld devices in cars, trucks, vans and sport utility vehicles (SUV's). Such VSM's are designed by various US manufacturers to blend into the vehicle's interior with a professional fit and factory-like appearance. Such VSM's are designed to use existing dash fittings behind the trim so that alterations to the vehicle's interior are eliminated. They are ergonomically designed for hands-free operation so the driver can keep eyes on the road, while positioning the electronic device within easy reach and operation. Such VSM's are custom designed for nearly every popular vehicle on the road.

VSM's feature a standard AMPS hole pattern for mounting cradles designed for popular handheld accessories, e.g., XM Satellite radios, holders, phone and personal digital assistant (PDA) or ipod interfaces, et cetera. They feature optimum vehicle mounting location so as to maximize safety for both the driver and the passengers. When properly installed VSM's are virtually unseen. They have no movable parts and custom bends so that no adjustments are required to perfect installation. Additionally, they install easily behind the dash bezel, often using existing original hardware, but they do not block airbags, nor obstruct dash amenities or controls. VSM's provide a rock solid mounting platform for the most popular handheld accessories.

However, known VSM's are limited precisely because they feature the standard AMPS hole pattern, which is a common hole pattern adopted by most electronics manufacturers for mounting their devices. Such hole patterns in their ability to provide a quick and easy way to move the handheld mount between vehicles since it must be connected to the AMPS hole pattern with fasteners.

SUMMARY OF THE INVENTION

The present invention is a novel suction cup mounting platform conformable to different non-planar surfaces, including but not limited to both convex and concave arcuate surfaces.

According to one aspect of the invention the novel suction cup mounting platform is a simple plate structured on one side with a substantially smooth and planar mounting plane, and structured on an opposite side with a fastening means adjacent to one surface and formed of a plurality of narrowly spaced substantially identical flexible leg portions each having a pressure sensitive adhesive (PSA) adhered to a bonding surface thereof facing away from the mounting plate. Narrow openings or slits separating adjacent leg portions permit them to move and flex independently, while the narrowness of the slits maximizes the bond line between the bonding surface and the target mounting surface.

The flexible leg portions are optionally preformed in a shallow concave arcuate or conical shape having the PSA at an interior portion thereof.

According to another aspect of the invention, the flexible leg portions are spaced away from the mounting plate by a hollow tubular spacer formed with a skirt portion distal from the mounting plate and having the flexible leg portions radially extended therefrom.

According to another aspect of the invention, a plastic carrier film or tape that is double-coated with the PSA and adhered to the bonding surfaces of the leg portions. According to one embodiment, the carrier film is a single monolithic disk sized about the same as the area described by the combined leg portions.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a top perspective view that illustrates the novel suction cup mounting platform by example and without limitation as being formed of the substantially rigid monolithic mounting plate formed of an injection moldable material, such as plastic, having a first face thereof being formed with the substantially smooth and planar surface of a type useful as a suction cup mounting surface;

FIG. 3 illustrates a second face of the substantially rigid monolithic mounting plate of the novel suction cup mounting platform as including by example and without limitation the fastening means as being compatible for fastening to a first predetermined hole pattern, for example a standard AMPS hole pattern;

FIG. 4 illustrates the monolithic mounting plate of the novel suction cup mounting platform being attached to the accessory vehicle mounting platform by the fastening means;

FIG. 5 illustrates the monolithic mounting plate of the novel suction cup mounting platform being attached to the accessory vehicle mounting platform in such manner that the suction cup mounting surface formed on the first face thereof is facing away therefrom and being substantially fully exposed for attachment thereto of the suction cup mounting devices;

FIG. 9 is a cross-section view that illustrates by example and without limitation the novel suction cup mounting platform being attached to the weighted mounting platform as discussed herein;

FIG. 10 is another cross-section view that illustrates by example and without limitation the novel suction cup mounting platform being attached to the weighted mounting platform as discussed herein;

FIGS. 14, 15 and 16 illustrate the present invention illustrated by example and without limitation as an alternative suction cup mounting platform formed as a substantially monolithic mounting plate having a fastening means adjacent to one surface and formed of a plurality of substantially identical flexible leg portions having a pressure sensitive adhesive (PSA) adhered to a bonding surface thereof facing away from the mounting plate, wherein FIG. 14 is a perspective view featuring the mounting plate, FIG. 15 is a side view, and FIG. 16 is perspective view featuring the flexible leg portions;

FIGS. 17, 18 and 19 illustrate an assembly of the alternative suction cup mounting platform with a plastic carrier film or tape that is double-coated with the PSA and adhered to the bonding surface of the leg portions, wherein FIG. 17 is a perspective view featuring the mounting plate, FIG. 18 is a side view, and FIG. 19 is perspective view featuring the flexible leg portions having the PSA adhered thereto;

FIGS. 22 and 23 illustrate another embodiment of the invention wherein a stem portion of the platform terminates at its upper end in a ball portion of a ball-and-socket coupler, wherein FIG. 22 is a perspective view, and FIG. 23 is side view.

DETAILED DESCRIPTION OF PREFERRED EMBODIMENT

In the Figures, like numerals indicate like elements.

Figure 1:
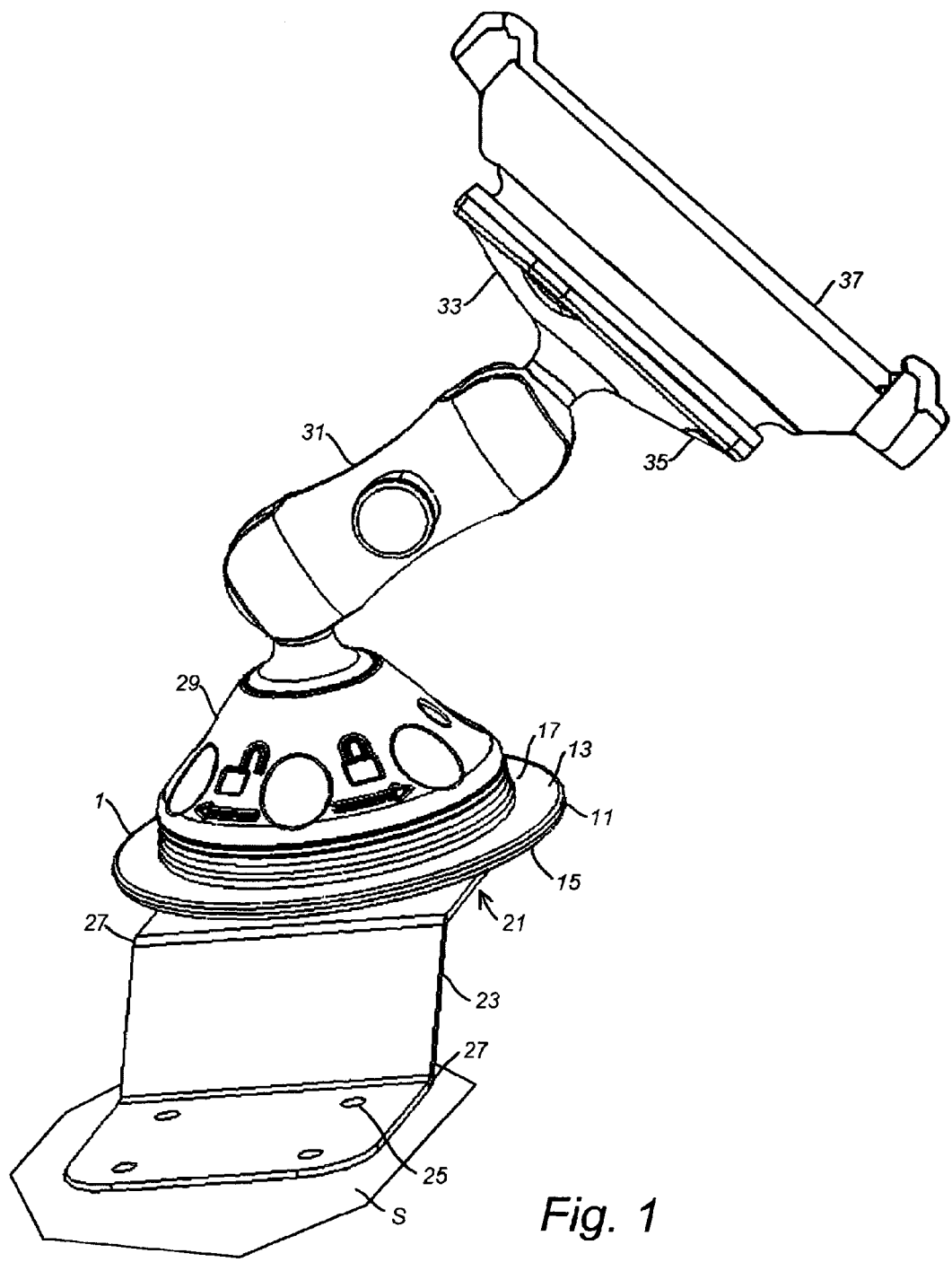
FIG. 1 is a perspective view showing an operational example of the present invention illustrated by example and without limitation as a novel suction cup mounting platform formed as a substantially rigid monolithic mounting plate having a suction cup mounting device mounted on a suction cup mounting surface thereof, the novel suction cup mounting platform is illustrated here by example and without limitation as being attached to a accessory vehicle mounting platform by fastening means and mounted within an interior space of a vehicle.

FIG. 1 shows the present invention illustrated by example and without limitation as a suction cup mounting platform 1 formed as a substantially rigid monolithic mounting plate 11 having first and second opposing faces 13 and 15. The first face 13 is formed with a substantially smooth and planar surface 17 of a type useful as a suction cup mounting surface. As illustrated in one or more subsequent Figures, the second face 15 includes a fastening means 19 for fastening to a first predetermined hole pattern 21, for example a standard AMPS hole pattern, which is a common hole pattern adopted by most electronics manufacturers for mounting cradles designed for their handheld electronics accessories. The fastening means 19 is thus compatible with the first predetermined standard AMPS hole pattern 21.

The fastening means 19 is utilized for fastening the mounting plate 11 to an accessory vehicle mounting platform 23 structured for installing a wide range of handheld devices in cars, trucks, vans and sport utility vehicles (SUVs), as is well-known in the art. The vehicle mounting platform 23 is formed with the predetermined hole pattern 21. Here, the accessory vehicle mounting platform 23 is further formed with a second predetermined hole pattern 25 designed to use existing dash fittings behind the trim so that alterations to the vehicle's interior surfaces are eliminated, as is also well-known in the art. The second predetermined hole pattern 25 is spaced away from the first predetermined hole pattern 21 so that the suction cup mounting platform 1 mounted thereon is substantially clear of the dash, including airbags, dash amenities and controls. The accessory vehicle mounting platform 23 is further formed with one or more custom bends 27 so that no adjustments are required to perfect installation in the vehicle. Additionally, the custom bends 27 permit the accessory vehicle mounting platform 23 to be installed easily behind the dash bezel, often using existing original hardware with the second predetermined hole pattern 25, but without blocking airbags, nor obstructing dash amenities or controls. Such accessory vehicle mounting platform 23 thus provide a rock solid mounting platform for mounting cradles to hold the most popular handheld electronics accessories.

Obviously, the first standard AMPS or other hole pattern 21 for mounting cradles for handheld electronics accessories prevents a suction cup device from drawing a vacuum. Therefore, known accessory vehicle mounting platforms 23 are limited to having such accessory cradles permanently secured using mechanical fasteners.

In contrast to known accessory vehicle mounting platforms 23, according to the present invention, after the accessory vehicle mounting platform 23 is installed within the interior of the vehicle, a suction cup mounting device 29 is mounted on the suction cup mounting surface 17 formed on the first face 13 of the mounting plate 11. Such suction cup mounting devices 29 include, but are not limited to, suction cup mounting devices of the type disclosed by the inventor of the present invention in U.S. Pat. No. 6,666,420, "Suction Cup Having Compact Axial Installation And Release Mechanism" issued Dec. 23, 2003, which is incorporated in its entirety herein by reference.

The suction cup mounting device 29 is illustrated here as having a dual ball-and-socket coupler 31, for example, of the well-known type disclosed by the inventor of the present invention in U.S. Pat. No. 5,845,885, "Universally Positionable Mounting Device" issued Dec. 8, 1998, which is incorporated in its entirety herein by reference. The coupler 31 supports another mounting platform 33 having a predetermined hole pattern 35, either a duplicate of the first predetermined standard AMPS hole pattern 21, or another hole pattern compatible with one or more mounting cradles 37 of types designed for receiving different handheld electronics accessories by different manufacturers. Else, the hole pattern 35 is a custom hole pattern compatible with one or more proprietary mounting cradles 37 of types designed for different handheld electronics accessories by a single manufacturer, such as the manufacturer of the present suction cup mounting platform 1. Accordingly, the present invention takes the accessory vehicle mounting platform 23 having the predetermined hole pattern 21 for attaching thereto one or more different mounting cradles 37 for receiving different handheld electronics accessories by different manufacturers and converts it into the suction cup mounting platform 1 having the suction cup mounting surface 17 formed on the first face 13 of the mounting plate 11. Thereafter, the user freely connects and disconnects the suction cup mounting devices 29 to the mounting surface 17 for holding a selected device mounting cradle 37 in a convenient location within the vehicle.

FIG. 2 illustrates the suction cup mounting platform 1 by example and without limitation as being formed of the substantially rigid monolithic mounting plate 11 formed of an injection moldable material, such as plastic, having the first face 13 thereof being formed with the substantially smooth and planar surface 17 of a type useful as a suction cup mounting surface. As illustrated here, the mounting plate 11 is optionally substantially round in shape having the suction cup mounting surface 17 covering substantially the entirety of the first face 13 thereof The face 13 having an optional peripheral edge break 39 to eliminate sharp edges. Alternatively, the suction cup mounting surface 17 covers a portion of the first face 13 less than substantially the entirety thereof The mounting plate 11 optionally may be another shape than substantially round; for example, the mounting plate 11 may be substantially square or polygonal without deviating from the scope and intent of the present invention.

FIG. 3 illustrates the second face 15 of the substantially rigid monolithic mounting plate 11, which by example and without limitation includes the fastening means 19 for fastening to the first predetermined hole pattern 21, for example the standard AMPS hole pattern. The fastening means 19 is thus compatible with the first predetermined standard AMPS hole pattern 21. Here, by example and without limitation, the fastening means 19 is provided as a plurality of bosses 41 raised on the second face 15, each of the bosses 41 being arranged in a pattern 43 that is compatible with the standard AMPS hole pattern used for the accessory vehicle mounting platform 23.

By example and without limitation, the bosses 41 are provided with a fastener receptor hole 45 substantially perpendicular to the second face 15, but that does not pierce the mounting plate 11. The receptor holes 45 are optionally formed with screw threads for receiving a threaded fastener, or are optionally smooth bore suitable for receiving a self-tapping screw fastener. Other fastening means 19 are also contemplated and may be substituted without deviating from the scope and intent of the present invention. For example, the fastening means 19 is optionally a plurality of threaded studs arranged in the pattern 43 that is compatible with the standard AMPS hole pattern 21 used for the accessory vehicle mounting platform 23.

Optionally, the second face 15 of the substantially rigid monolithic mounting plate 11 further includes a stiffener structure 47. By example and without limitation, the optional stiffener structure 47 is integrally formed with the monolithic mounting plate 11 as an intermittent or continuous (shown) substantially circular hoop or ridge spaced outboard of the bosses 41 but may be inboard of an outer peripheral edge break 49 of the second face 15, as illustrated here by example and without limitation. As illustrated here, the optional stiffener structure 47 also provides a mounting seat relative to the accessory vehicle mounting platform 23 by being projected away from the second face 15 of the mounting plate 11 farther than the bosses 41 of the fastening means 19. Accordingly, the optional stiffener structure 47, when present, engages the accessory vehicle mounting platform 23 in a ring outside of the fastening means 19 securing the mounting plate 11 thereto.

FIG. 4 illustrates the monolithic mounting plate 11 of the suction cup mounting platform 1 being attached to the accessory vehicle mounting platform 23 by the fastening means 19, which is illustrated here by example and without limitation as a plurality of screw-type fasteners 51 inserted through the first predetermined hole pattern 21 in the accessory vehicle mounting platform 23. As illustrated, the monolithic mounting plate 11 of the suction cup mounting platform 1 is sized relative to the accessory vehicle mounting platform 23 such that the second predetermined hole pattern 25 weighted mounting platform 53 using existing dash fittings behind the trim.

FIG. 5 illustrates the monolithic mounting plate 11 of the suction cup mounting platform 1 being attached to the accessory vehicle mounting platform 23 in such manner that the first face 13 is facing away therefrom with the suction cup mounting surface 17 formed thereon being substantially fully exposed for attachment thereto of the suction cup mounting devices 29.

Figure 6:
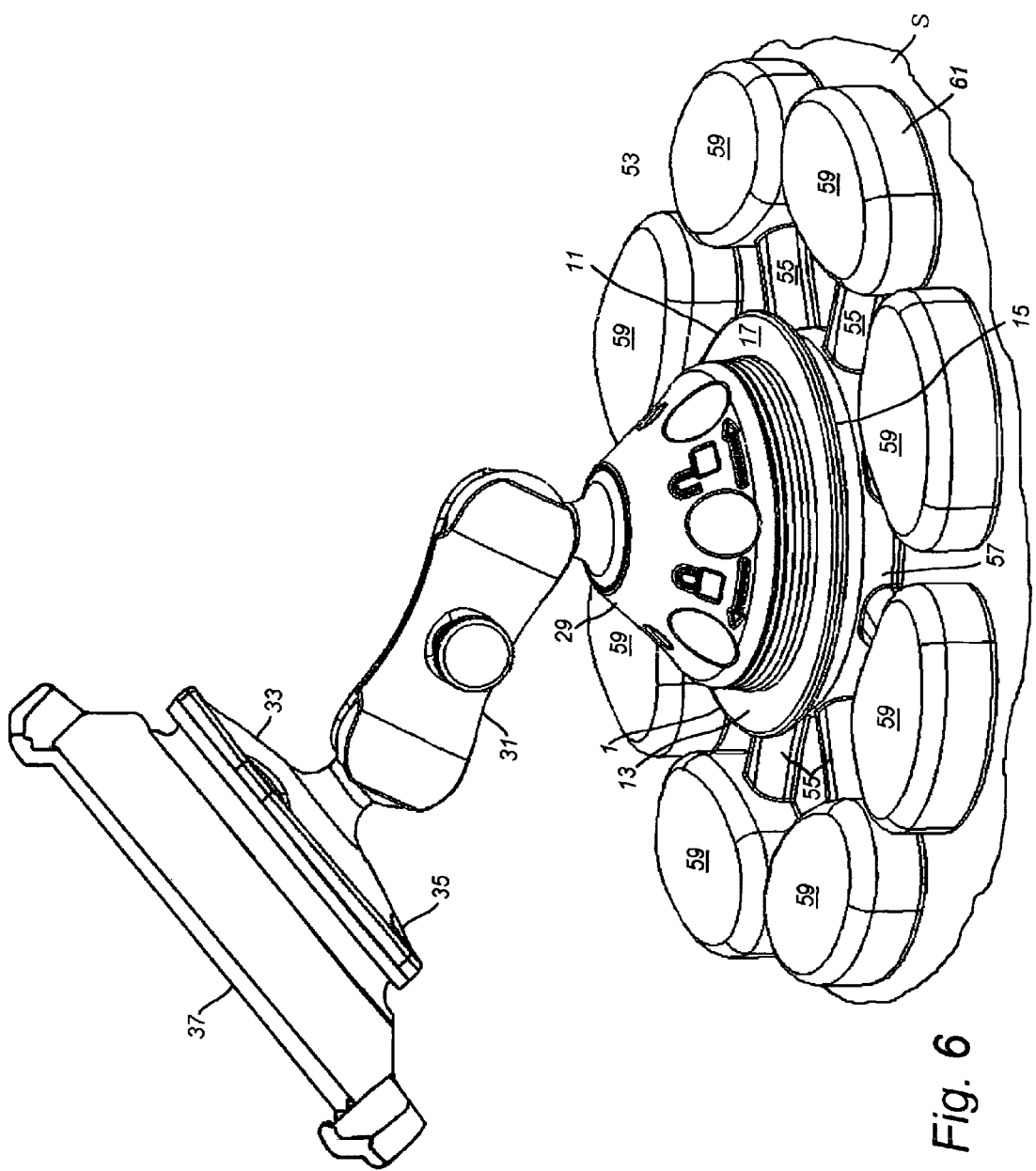
FIG. 6 is a perspective view showing an operational example of the novel suction cup mounting platform by example and without limitation as being attached to a weighted mounting platform and mounted within an interior space of a vehicle.

FIG. 6 illustrates the suction cup mounting platform 1 being attached to a weighted mounting platform 53, for example, of the type disclosed by the inventor of the present invention in U.S. Pat. No. 6,840,487, "Weighted Mounting Platform" issued Jan. 11, 2005, which is incorporated in its entirety herein by reference, or in U.S. patent application Ser. No. 11/975,575, "Method For Manufacturing A Weighted Base" filed in the name of the inventor of the present invention on Oct. 20, 2007, which is incorporated in its entirety herein by reference. Accordingly, the weighted mounting platform 53 is illustrated here as being of the type having a plurality of flexible legs 55 extending radially from a common central hub portion 57, each of the legs 55 having a heavy lump 59 at an end thereof distal from the common central hub 57. A sheath or coating 61 of soft elastomeric material is optionally formed over substantially the entire surface of the flexible legs 55 and the heavy lumps 59, and all or part of the common central hub 57. The monolithic mounting plate 11 of the suction cup mounting platform 1 being attached to the central hub 57 of the weighted mounting platform 53 in such manner that the flexible legs 55 with the heavy lumps 59 at the distal ends thereof are free to drape over an interior surface S of the vehicle, such as the dash or a console or passenger seat. The suction cup mounting platform 1 thus easily supports the suction cup mounting device 29 in an upright manner on the weighted mounting platform 53 with the suction cup mounting device 29 being coupled by suction to the substantially smooth and planar suction cup mounting surface 17 portion of the first face 13 of the mounting plate 11.

Figure 7:
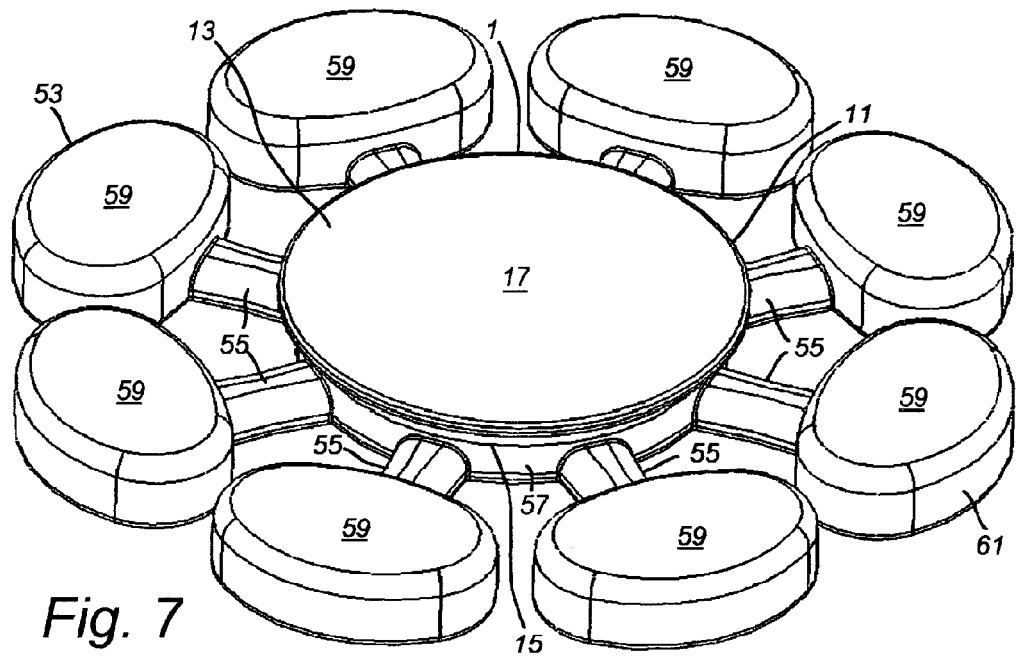
FIG. 7 illustrates the novel suction cup mounting platform being attached to the weighted mounting platform with the suction cup mounting device being removed for clarity from the suction cup mounting surface portion of the first face of the mounting plate, as by release of the suction holding it thereto.

FIG. 7 illustrates the suction cup mounting platform 1 being attached to the weighted mounting platform 53 with the suction cup mounting device 29 being removed for clarity from the suction cup mounting surface 17 portion of the first face 13 of the mounting plate 11, as by release of the suction holding it thereto. As discussed herein, the monolithic mounting plate 11 of the suction cup mounting platform 1 is attached to the central hub 57 of the weighted mounting platform 53 in such manner that the flexible legs 55 with the heavy lumps 59 at the distal ends thereof are free to drape over an interior surface S of the vehicle, such as the dash or a console or passenger seat.

Figure 8:
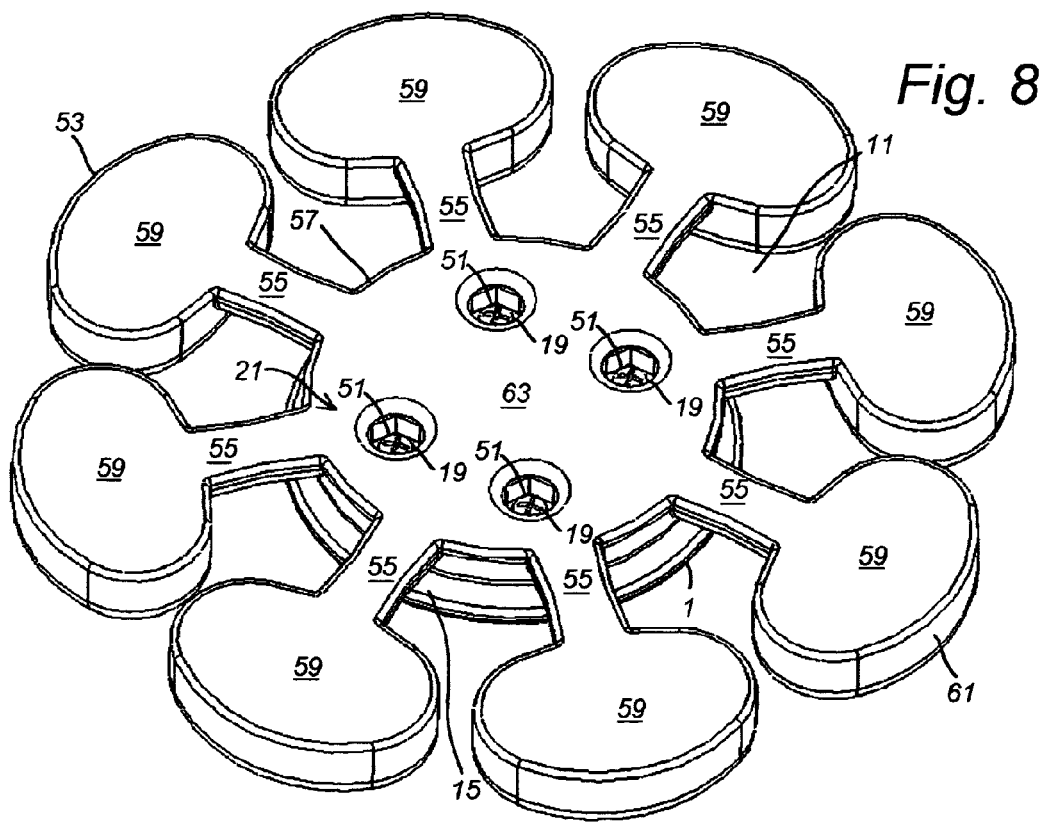
FIG. 8 illustrates the novel suction cup mounting platform being attached to the weighted mounting platform having the common central hub thereof being formed with a hole pattern through a base portion thereof, such as the standard AMPS hole pattern.

FIG. 8 illustrates the weighted mounting platform 53 with the common central hub 57 thereof being formed with a hole pattern through a base portion 63 thereof, such as the first predetermined standard AMPS hole pattern 21. Accordingly, the suction cup mounting platform 1 is attached to the weighted mounting platform 53 by the fastening means 19, which as discussed herein, is compatible with the first predetermined standard AMPS hole pattern 21.

FIG. 9 illustrates the suction cup mounting platform 1 is attached to the weighted mounting platform 53 as discussed herein. The monolithic mounting plate 11 of the suction cup mounting platform 1 is shown herein cross-section, as is the weighted mounting platform 53. As can be seen here, the monolithic mounting plate 11 is structured to fit onto the central hub 57 of the weighted mounting platform 53 without interference with the flexible legs 55 nor with the heavy lumps 59 at the distal ends thereof Furthermore, the optional stiffener structure 47 is integrally formed with the second face 15 of the monolithic mounting plate 11 to fit securely against the central hub 57 of the weighted mounting platform 53. The suction cup mounting platform 1 thus presents the first face 13 of the monolithic mounting plate 11 with the suction cup mounting surface 17 formed thereon being substantially fully exposed for attachment thereto of the suction cup mounting devices 29.

FIG. 10 is another cross-section view of both the weighted mounting platform 53 and the suction cup mounting platform 1 attached thereto. Here, the view is perspective from the base portion 63 of the common central hub 57. This view shows the monolithic mounting plate 11 being secured to the central hub 57 of the weighted mounting platform 53 by the fastening means 19, which as discussed herein, is either threaded screw fasteners received into the receptor holes 45, or threaded studs projected from the second face 15 of the mounting plate 11 and received into the standard AMPS hole pattern 21 used for the accessory vehicle mounting platform 23.

Here, the fastening means 19 is illustrated by example and without limitation as the plurality of screw-type fasteners 51 received into the receptor holes 45 in the bosses 41 projected from the second face 15 of the mounting plate 11. The plurality of screw fasteners 51 are either conventional screw fasteners received into threaded receptor holes 45, or self-tapping screw fasteners received into smooth bore receptor holes 45. Tightening the fastening means 19 snugs the optional integral stiffener structure 47 against a mounting surface 67 of the weighted mounting platform's central hub 57 outboard of the bosses 41, which prevents tipping of the mounting plate 11. After the weighted mounting platform 53 is installed within the interior of the vehicle, the suction cup mounting device 29 is mounted on the suction cup mounting surface 17 formed on the first face 13 of the mounting plate 11, as illustrated herein.

Figure 11:
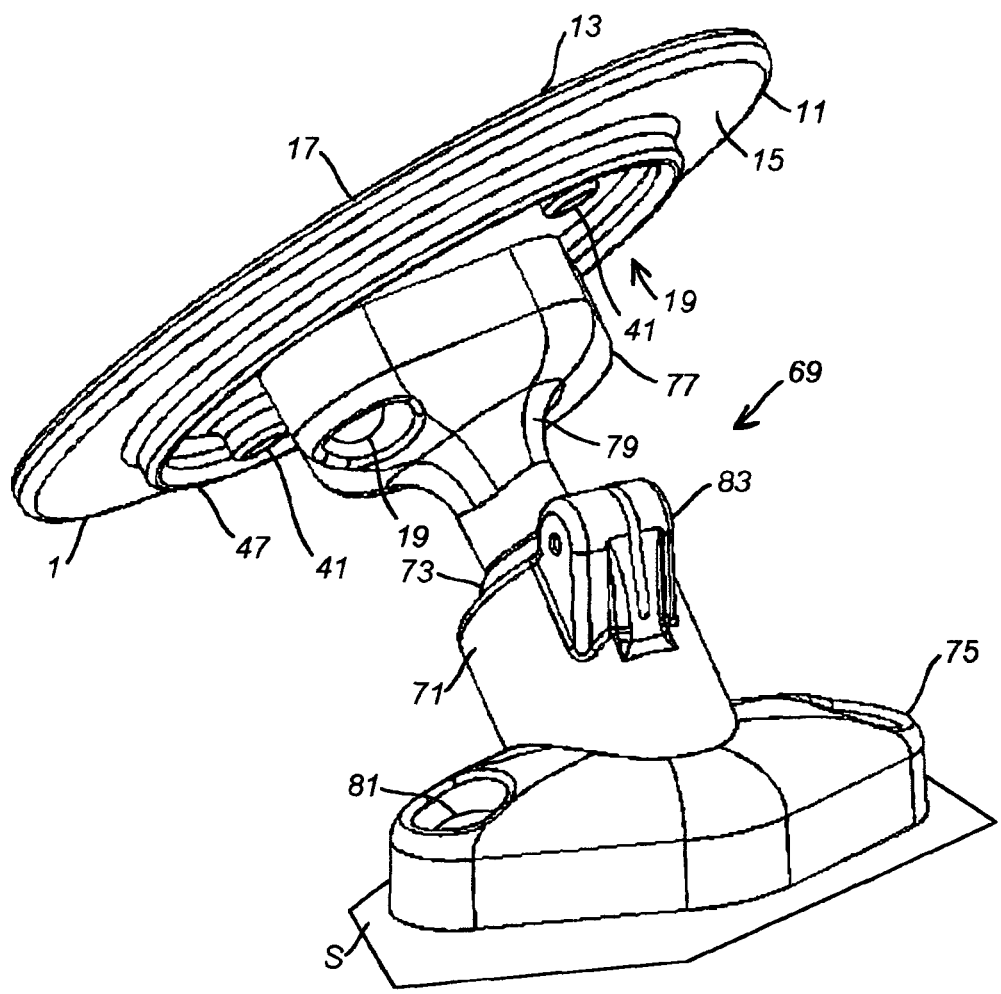
FIG. 11 is a perspective view showing an operational example of the novel suction cup mounting platform by example and without limitation as being attached to an interlockable ball-and-socket type swivel mount assembly and mounted within an interior space of a vehicle.

FIG. 11 illustrates the suction cup mounting platform 1 being attached to an interlockable ball-and-socket type swivel mount assembly 69, for example, of the type disclosed by the inventor of the present invention in U.S. Pat. No. 6,561,476, "Positively-Positionable Mounting Apparatus" issued May 13, 2003, which is incorporated in its entirety herein by reference. The swivel mount assembly 69 includes a fixed portion 71 of a ball-and-socket type swivel 73 projected from a first mounting base 75. The swivel mount assembly 69 also includes a second mounting base 77 projected from a swivel portion 79 of the ball-and-socket type swivel 73. One or more fasteners 81 secure the first mounting base 75 to the interior surface S of the vehicle. The fastening means 19 secures the monolithic mounting plate 11 of the suction cup mounting platform 1 to the second mounting base 77. The ball-and-socket type swivel 73 is interlockable by means of a releasable clamp 83 for securing the second mounting base 77 after a desired rotational and angular orientation is achieved for the suction cup mounting surface 17 on the first face 13 of the mounting plate 11. The suction cup mounting device 29 is secured by vacuum to the substantially smooth and planar suction cup mounting surface 17. Thereafter, the swivel mount assembly 69 is operated in a known manner for presenting the suction cup mounting surface 17 and the suction cup mounting device 29 secured thereon in different desired rotational and angular orientations.

Figure 12:
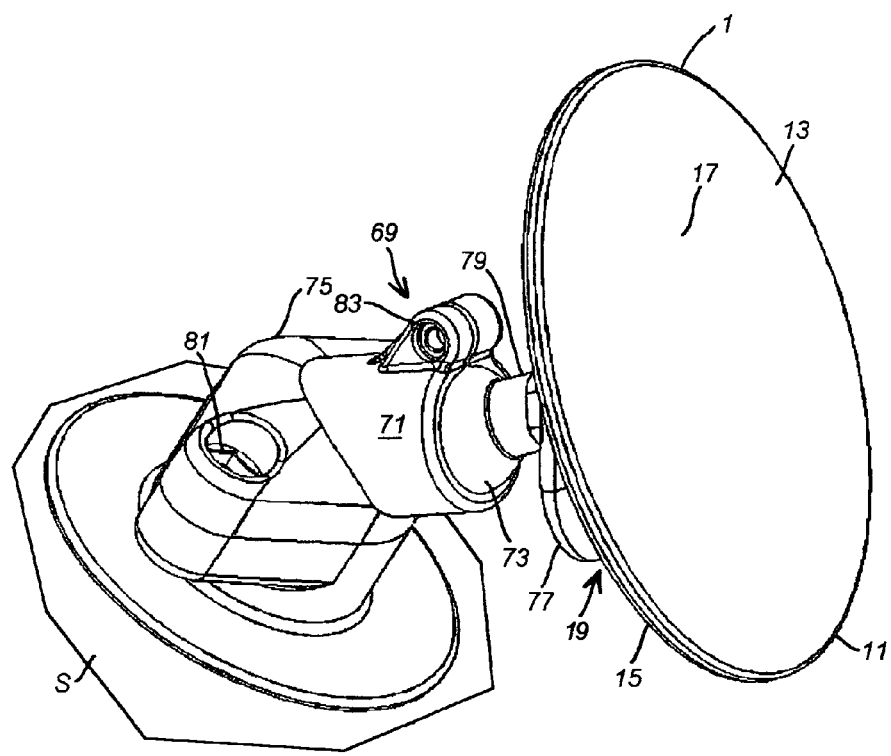
FIG. 12 is another perspective view showing an operational example of the novel suction cup mounting platform by example and without limitation as being attached to an interlockable ball-and-socket type swivel mount assembly and mounted within an interior space of a vehicle.

FIG. 12 illustrates the suction cup mounting platform 1 again being attached to the interlockable ball-and-socket type swivel mount assembly 69. Here the swivel mount assembly 69 is attached to the interior surface S of the vehicle by a resilient adhesive pad, commonly known as a Pressure Sensitive Adhesive or PSA 85 applied between the bottom surface of the first mounting base 75 and an interior surface S of the vehicle. Thereafter, the swivel mount assembly 69 is operated in a known manner for presenting the suction cup mounting surface 17 of the mounting plate 11 and the suction cup mounting device 29 secured thereon in different desired rotational and angular orientations.

Figure 13:
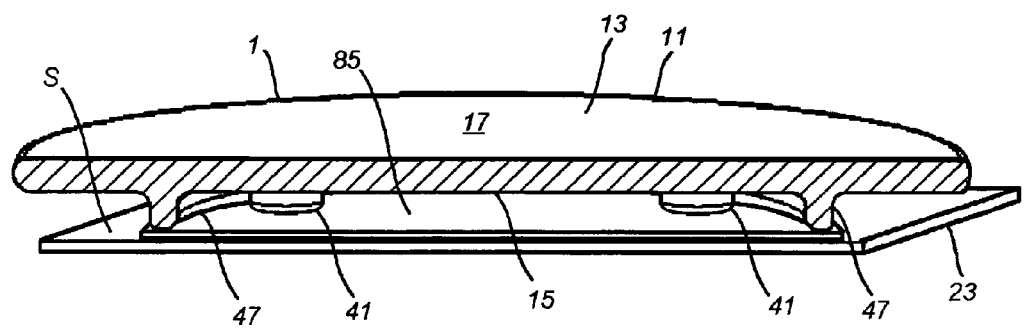
FIG. 13 illustrates the novel suction cup mounting platform being attached to either of the accessory vehicle mounting platform or directly to an interior surface of the vehicle, such as the dash or a console utilizing a Pressure Sensitive Adhesive or PSA fastening means.

FIG. 13 illustrates the suction cup mounting platform 1 being attached to either of the accessory vehicle mounting platform 23 or directly to an interior surface S of the vehicle, such as the dash or a console. Here, the fastening means 19 utilizes the PSA 85 in place of the plurality of screw-type fasteners 51 for fastening the second face 15 of the mounting plate 11 to either of the accessory vehicle mounting platform 23 or directly to an interior surface S of the vehicle. For example, the PSA 85 is applied between the bottom surface or second face 15 of the mounting plate 11 directly between the either or both of the bosses 41 and the stiffener structure 47 and either the accessory vehicle mounting platform 23 or an interior surface S of the vehicle. Accordingly, other structures, such as but not limited to the PSA 85, can be substituted for the screw-type fasteners 51 for providing the fastening means 19 without deviating from the scope and intent of the present invention.

When the PSA 85 is utilized as the fastening means 19 for fastening the mounting plate 11 directly to an interior surface S of the vehicle, the suction cup mounting platform 1 becomes a permanent suction cup mounting platform within the vehicle.

Alternative Embodiments

FIGS. 14, 15 and 16 show the present invention illustrated by example and without limitation as an alternative suction cup mounting platform 1 formed as the substantially monolithic mounting plate 11 having first and second opposing faces 13 and 15. The first face 13 is formed with the substantially smooth and planar surface 17 of a type useful as a suction cup mounting surface. The suction cup mounting surface 17 optionally covers a portion of the first face 13 less than substantially the entirety thereof. The mounting plate 11 is illustrated here as being substantially round, however, the mounting plate 11 may be another shape than substantially round; for example, the mounting plate 11 may be substantially square or polygonal without deviating from the scope and intent of the present invention. The face 13 is optionally formed with the peripheral edge break 39 to eliminate sharp edges.

The mounting platform 1 is optionally formed of an injection moldable material, such as plastic, that is relatively flexible in thin sections while being substantially rigid in thicker sections. According to one embodiment, the mounting platform 1 is optionally formed of a polycarbonate material, which is known to be virtually unbreakable. Optionally, the polycarbonate material or other plastic material forming the mounting platform 1 is optically clear or transparent, whereby the mounting platform 1 virtually disappears into the target mounting surface S on which it is mounted. Here, the mounting plate 11 is formed having a thick cross-section substantially strong and rigid enough to operate as a suction cup mounting surface.

The second face 15 includes a fastening means 119 for fastening to a non-planar surface. The fastening means 119 is utilized for fastening the mounting plate 11 to any surface, including any non-planar surface, such as by example and without limitation, a vehicle door, console or dashboard surface. The fastening means 119 is capable of fastening to a substantially rigid mounting surface, or a substantially soft and yielding mounting surface. According to one embodiment, the fastening means 119 includes a plurality of substantially identical flexible leg portions 121 each formed of substantially smooth and uniformly thin cross-section as to be relatively flexible and yet virtually unbreakable. The leg portions 121 each extend substantially radially outwardly from a position adjacent to a center portion of the second face 15 of the mounting plate 11. Each of the leg portions 121 is formed with a bonding surface 123 facing away from the second face 15 of the mounting plate 11. The bonding surface 123 is provided with a pressure sensitive adhesive (PSA) 125 capable of boding to the target mounting surface S on which the alternative suction cup mounting platform 1 is mounted.

According to one embodiment illustrated here by example and without limitation, the leg portions 121 each extend substantially radially outwardly from a substantially disc-shaped base portion 127 of a post or stem 129 projected substantially central of the second face 15 of the mounting plate 11. As illustrated here by example and without limitation, a periphery 131 of the substantially disc-shaped base portion 127 is sized about the same size than the mounting plate 11 or larger, and the leg portions 121 are fractional segments or petals of the substantially disc-shaped base portion 127 divided by relatively narrow radial openings or slits 133 between adjacent leg portions 121 extending a substantial majority of the distance between the periphery 131 and the stem 129. The slits 133 permit adjacent leg portions 121 to move and flex independently, while their narrowness maximizes the bond line between the bonding surface 123 and the target mounting surface S.

As illustrated here, the stem 129 is optionally configured as having a thin-walled hollow substantially cylindrical tube portion 135 with a flared skirt portion 137 coupled into the leg portions 121. Forming the stem 129 as the hollow substantially cylindrical tube portion 135 has the unexpected effect of permitting the flared skirt portion 137 of the stem 129 to be conformed more closely to the target mounting surface S, which in turn permits the plurality of leg portions 121 to be conformed more closely to the mounting surface S as well. Conforming the plurality of leg portions 121 more closely to the mounting surface S causes their respective bonding surfaces 123 to be more securely bonded to the mounting surface S, as disclosed herein.

The flared skirt portion 137 of the stem 129 and the plurality of leg portions 121 are optionally formed substantially parallel with the mounting plate 11. Else, as illustrated here, the plurality of leg portions 121 and, optionally, the flared skirt portion 137 of the stem 129 optionally form a shallow conical shape with the bonding surfaces 123 of the leg portions 121 forming an interior 139 of the conical shape facing away from the second face 15 of the mounting plate 11. Alternatively, the bonding surfaces 123 of the leg portions 121 form a shallow arcuate dish shape instead of the shallow conical shape having the pressure sensitive adhesive (PSA) 125 at its interior 139 without deviating from the scope and intent of the present invention. The optional shallow conical or arcuate shape has the unexpected effect of permitting the flared skirt portion 137 of the stem 129 to be conformed more closely to the target mounting surface S when the mounting surface S is a convex surface with the more secure bonding effects discussed herein, without detracting from conforming the plurality of leg portions 121 to a concave mounting surface S and securely bonding thereto.

Optionally, a stabilizer 141 is formed as a plurality of gussets or ribs joined between the second face 15 of the mounting plate 11 and the flared skirt portion 137 of the stem 129. The gussets 141 stabilize the mounting plate 11 relative to the stem 129 when the leg portions 121 are bonded to the target mounting surface S.

FIGS. 17, 18 and 19 illustrate an assembly of the alternative suction cup mounting platform 1, wherein a plastic carrier film or tape 143 is double-coated with the pressure sensitive adhesive (PSA) 125 and bonded to the bonding surface 123 of the leg portions 121. By example and without limitation, the carrier film or tape 143 is configured as a single monolithic disk that is sized to cover substantially the entire bonding surface 123.

A strippable protective film 145 is laid over the exposed portions of the PSA 125 to protect the adhesive from collecting dust and dirt that could reduce its bonding strength.

Figure 20:
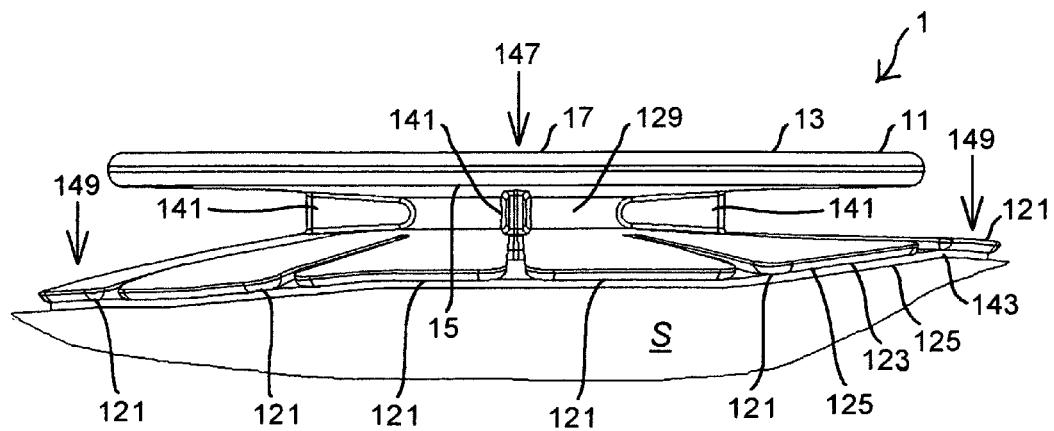
FIG. 20 illustrates the alternative suction cup mounting platform being installed on a non-planar surface.

FIG. 20 illustrates the alternative suction cup mounting platform 1 being installed on a non-planar mounting surface S. As illustrated, after the protective film 145 is stripped away, the bonding surface 123 of the leg portions 121 with the PSA 125, including the optional double-coated plastic film or tape 143 if present, is laid against the target mounting surface S. A pressure 147, such as a thumb or palm pressure, is applied to the monolithic mounting plate 11, for example, at the center of the suction cup mounting surface 17 of the first face 13 thereof The centrally applied thumb or palm pressure 147 is sufficient to seat the base portion 127 of the central post or stem 129 against the mounting surface S and conform the leg portions 121 to the surface contours. Additional pressures 147, such as finger or thumb pressures, are optionally applied to the upper surfaces 149 of the individual leg portions 121 for further effectuating adhesion of the PSA 125.

Optionally, the alternative suction cup mounting platform 1 is preformed to the shape of the target mounting surface S. By example and without limitation, after a mounting location is selected and confirmed and before the protective film 145 is stripped away from the bonding surface 123, the alternative suction cup mounting platform 1 is positioned on the target mounting surface S in the selected location. The pressure 147 is applied to the to the monolithic mounting plate 11 to seat the base portion 127 of the central post or stem 129 against the mounting surface S and conform the leg portions 121 to the surface contours. The additional pressures 147 are optionally applied to the upper surfaces 149 of the individual leg portions 121 for further conforming the leg portions 121 to the surface contours. With the leg portions 121 thus partially preformed to match the contoured shape of the target mounting surface S, the protective film 145 is stripped away, and the bonding of the leg portions 121 to the surface S is performed as discussed herein. Thereafter, the alternative suction cup mounting platform 1 is effectively bonded to the selected target mounting surface S with the monolithic mounting plate 11 stabilized by the gussets 141 and the suction cup mounting surface 17 presented on the first face 13 thereof.

As discussed herein, the material of the alternative suction cup mounting platform 1, including the mounting plate 11, stem 129, gussets 141 and leg portions 121, is optionally substantially optically clear or transparent, whereby the mounting platform 1 virtually disappears into the target mounting surface S on which it is mounted. Accordingly, when the suction cup mounting device 29 is not present thereon, the alternative suction cup mounting platform 1 does virtually nothing to mar the aesthetics of the surface S on which it is mounted.

Figure 21:
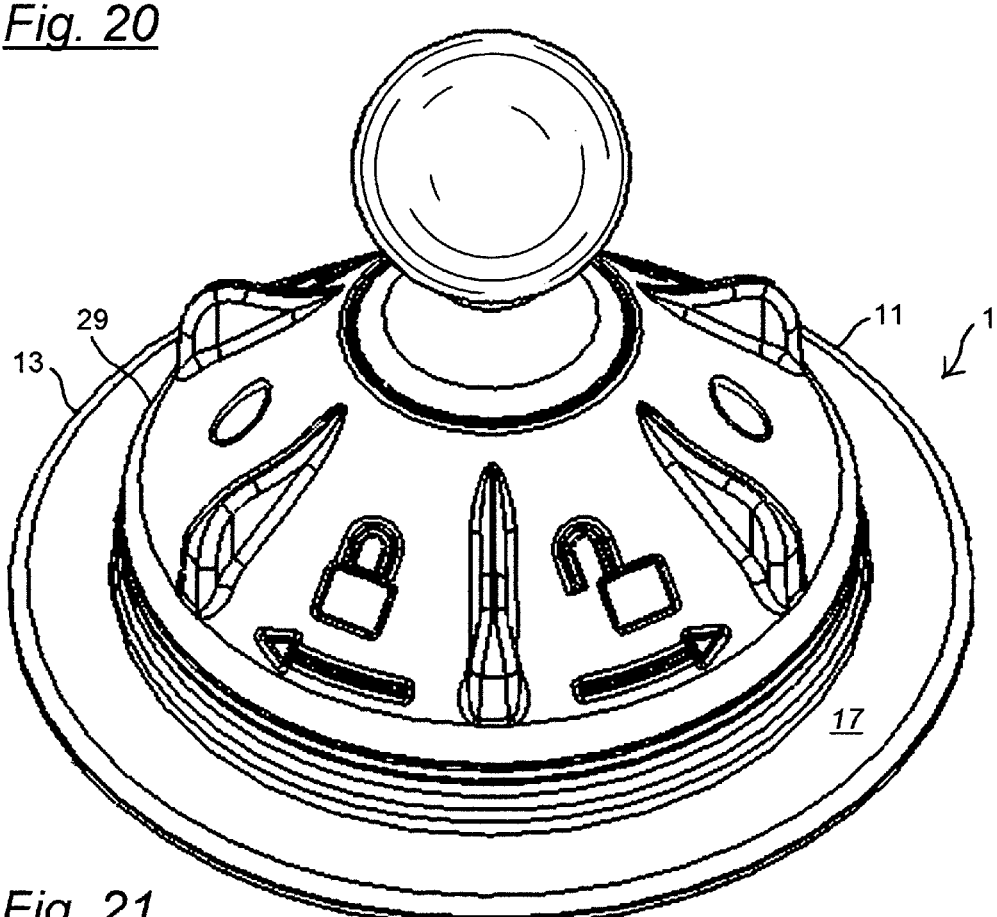
FIG. 21 illustrates the alternative suction cup mounting platform having a suction cup mounting device mounted on a suction cup mounting surface of the mounting plate.

FIG. 21 illustrates the alternative suction cup mounting platform 1 having the suction cup mounting device 29 mounted on the suction cup mounting surface 17 of the first face 13 of the mounting plate 11.

Figure 22:
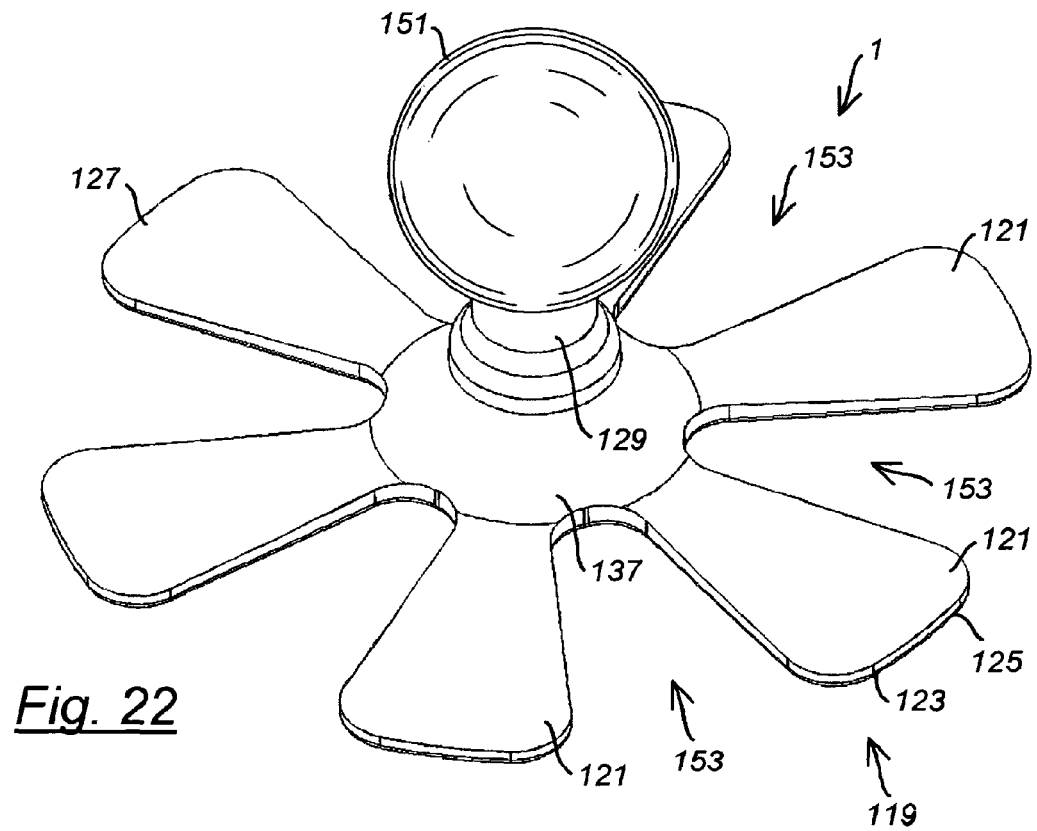
Figure 23:
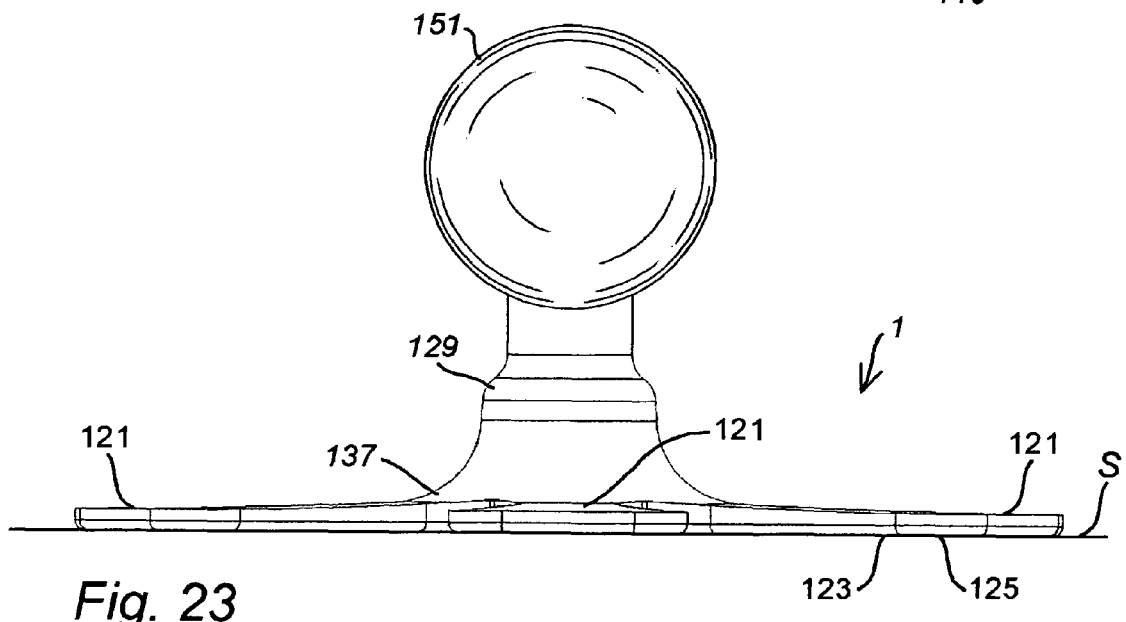

FIGS. 22 and 23 illustrate another embodiment of the invention wherein the stem 129 terminates at its upper end in a ball portion 151 of a ball-and-socket coupler 31, for example, of the well-known type disclosed by the inventor of the present invention in U.S. Pat. No. 5,845,885, which is incorporated in its entirety herein by reference. The leg portions 121 each extend substantially radially outwardly from the flared skirt portion 137 of the substantially disc-shaped base portion 127 of the stem 129. As illustrated here by example and without limitation, the leg portions 121 are fractional segments or petals of the substantially disc-shaped base portion 127 divided by radial openings or slits 153 between adjacent leg portions 121 extending a substantial majority of the distance between the periphery 131 and the stem 129. As illustrated here, the radial openings or slits 153 are relatively wide as compared with the slits 133 shown herein.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A suction cup mounting platform, the mounting platform comprising:
   a substantially rigid plate having first and second opposing faces;
   a suction cup mounting surface formed on the first face of the plate;
   a skirt portion coupled to the second face of the plate;
   a plurality of flexible legs coupled to the skirt portion and having a bonding surface facing away from the plate;
   a rib joined between the second face of the plate and the skirt portion; and
   a bonding agent adhered to the bonding surface of the plurality of flexible legs.

2. The mounting platform of claim 1, further comprising a stand-off coupled to the second face of the plate adjacent to a center portion thereof, the stand-off further comprising the skirt portion adjacent to an end portion thereof distal from the plate; and
   wherein the plurality of the legs is further projected substantially radially outwardly of the skirt portion of the stand-off.

3. The mounting platform of claim 2 wherein the stand-off further comprises a tube portion being substantially hollow at least adjacent to the skirt portion of the stand-off.

4. The mounting platform of claim 1, wherein the bonding agent further comprises a pressure sensitive adhesive adhered to the bonding surface of the plurality of the legs.

5. The mounting platform of claim 1, further comprising a carrier film adhered to the plurality of the legs and having the pressure sensitive adhesive provided on an opposing surface thereof.

6. A suction cup mounting platform, the mounting platform comprising:
   a substantially rigid plate having first and second opposing faces;
   a suction cup mounting surface formed on the first face of the plate;
   a skirt portion coupled to the second face of the plate;
   a plurality of flexible legs coupled to the skirt portion and having a bonding surface facing away from the plate;
   a rib joined between the second face of the plate and the skirt portion; and
   a bonding agent adhered to the bonding surface of the plurality of flexible legs;
   wherein the skirt portion further comprises an opening between adjacent legs and communicating with a periphery of the skirt, the rib being joined between the second face of the plate and the skirt portion adjacent to one of the openings.

7. A suction cup mounting platform, the mounting platform comprising:
   a substantially rigid monolithic plate having first and second opposing faces;
   a substantially smooth and planar surface formed on the first face;
   a plurality of radially extended and substantially flexible leg members spaced away from the plate at a central portion of the second face thereof, each of the leg members having a bonding surface facing away from the plate;
   a substantially tubular spacer coupled between the leg members and the plate adjacent to the central portion of the second face thereof, wherein the spacer further comprises a terminal skirt portion distal from the second face of the plate and having the leg members extended therefrom;
   a rib joined between the plate at the second face thereof and the terminal skirt portion; and
   a pressure sensitive adhesive coupled to the bonding surface of each leg member.

8. The mounting platform of claim 7 wherein the skirt portion of the spacer further comprises one of a conical shape and an arcuate shape.

9. The mounting platform of claim 8, further comprising a plastic film double-coated with the pressure sensitive adhesive and bonded to the respective bonding surface of the leg members.

10. The mounting platform of claim 8 wherein the plate, spacer and leg members are further formed as a monolithic whole of a single substantially transparent material, and the pressure sensitive adhesive further comprises a substantially transparent material.

11. The mounting platform of claim 7 wherein the plurality of flexible leg members are further of about the same or relatively larger diameter than a diameter of the plate.

12. The mounting platform of claim 7, wherein the skirt portion of the spacer further comprises substantially radially extended openings separating the leg members and communicating with a periphery of the skirt; and further comprising a plurality of ribs joined between the plate at the second face thereof and the terminal skirt portion adjacent to different ones of the openings.

13. A substantially transparent suction cup mounting platform, the mounting platform comprising:

a monolithic platform formed of a substantially transparent material, the monolithic platform comprising:

a substantially rigid plate portion comprising first and second opposing spaced apart faces, a substantially smooth and planar surface formed on the first face, a spacer portion projected from a central portion of the second face, and a flared skirt portion formed on the spacer distal from the second face, the skirt portion comprising a plurality of substantially flexible radial leg members comprising a bonding surface facing away from the plate;

a rib joined between the flared skirt portion and at least one of the spacer and the second face of the plate; and a pressure sensitive adhesive adhered to the bonding surface of each leg member.

14. The mounting platform of claim 13 wherein the flared skirt portion further comprises one of a conical shape and an arcuate shape facing away from the second face of the plate.

15. The mounting platform of claim 13, further comprising a substantially transparent monolithic carrier film double-coated with the pressure sensitive adhesive and adhered to the bonding surface of each leg member.

16. The mounting platform of claim 7 wherein the leg members are separated by openings extended therebetween and communicating with a periphery of the skirt; and further comprising a plurality of ribs joined between the second face of the plate and the flared skirt portion adjacent to different ones of the openings extended between the leg members.

* * * * *